United States Patent
Shachar et al.

(10) Patent No.: US 9,999,825 B2
(45) Date of Patent: Jun. 19, 2018

(54) SMART-COURT SYSTEM AND METHOD FOR PROVIDING REAL-TIME DEBRIEFING AND TRAINING SERVICES OF SPORT GAMES

(71) Applicant: PLAYSIGHT INTERACTIVE LTD., Kfar Saba (IL)

(72) Inventors: Chen Shachar, Kohav Yair (IL); Evgeni Khazanov, Petah Tikva (IL); Yoram Ben Zur, Tzur Yigal (IL)

(73) Assignee: PLAYSIGHT INTERACTIVE LTD., Kfar Saba (IL)

( * ) Notice: Subject to any disclaimer, the term of this patent is extended or adjusted under 35 U.S.C. 154(b) by 162 days.

(21) Appl. No.: 14/370,006

(22) PCT Filed: Feb. 21, 2013

(86) PCT No.: PCT/IL2013/050162
§ 371 (c)(1),
(2) Date: Jun. 30, 2014

(87) PCT Pub. No.: WO2013/124856
PCT Pub. Date: Aug. 29, 2013

(65) Prior Publication Data
US 2015/0018990 A1 Jan. 15, 2015

Related U.S. Application Data

(60) Provisional application No. 61/602,360, filed on Feb. 23, 2012.

(51) Int. Cl.
*A63F 9/24* (2006.01)
*A63B 71/02* (2006.01)
(Continued)

(52) U.S. Cl.
CPC ............. *A63B 71/02* (2013.01); *A63B 71/04* (2013.01); *G06K 9/00724* (2013.01); *G06T 7/20* (2013.01); *G06T 7/292* (2017.01); *A63B 2225/50* (2013.01)

(58) Field of Classification Search
None
See application file for complete search history.

(56) References Cited

U.S. PATENT DOCUMENTS

| 5,574,845 A | 11/1996 | Benson et al. |
| 6,877,010 B2 | 4/2005 | Smith-Semedo et al. |

(Continued)

FOREIGN PATENT DOCUMENTS

| WO | 02061684 A2 | 8/2002 |
| WO | 2006111928 A2 | 10/2006 |

(Continued)

OTHER PUBLICATIONS

Wang et al., Content-based image indexing and searching using Daubechies' wavelets. Int J Digit Libr 1997;1:311-328.
(Continued)

*Primary Examiner* — Paul A D'Agostino
(74) *Attorney, Agent, or Firm* — Acuity Law Group, PC; Michael A. Whittaker

(57) ABSTRACT

A Smart-court system, adaptive to constrained sport environment, for enabling real time analysis and debriefing of sport activities is provided herein. The Smart-court system is comprised of: (i) an automatic recording system comprising a plurality of video cameras located in a court, arranged to real-time (RT) recording of a sport session and utilizing automatic calibration and stabilization module; and (ii) a data processing system comprising: (a) a capture module for grabbing a video stream; (b) an objects' detector module arranged to extract during the RT sport session, the objects
(Continued)

from the foreground of each frame; (c) an event module for automatically analyzing, the motion and the activities of the tracked objects for automatically identifying and classifying events, creating a synchronized event log and calculating statistics that occurred during the RT sport session; and (d) a presentation module enabling to perform instant debriefing, combined biomechanical and tactical analysis of the video.

36 Claims, 8 Drawing Sheets

(51) Int. Cl.
| | | |
|---|---|---|
| *G06T 7/20* | (2017.01) | |
| *G06K 9/00* | (2006.01) | |
| *A63B 71/04* | (2006.01) | |
| *G06T 7/292* | (2017.01) | |

(56) References Cited

U.S. PATENT DOCUMENTS

| | | | |
|---|---|---|---|
| 7,756,876 B2 | 7/2010 | Smith-Semedo et al. | |
| 8,060,515 B2 | 11/2011 | Smith-Semedo et al. | |
| 8,566,315 B1* | 10/2013 | Davtchev | G06F 17/30817 707/736 |
| 9,087,297 B1* | 7/2015 | Filippova | G06N 5/025 |
| 2002/0115047 A1* | 8/2002 | McNitt | A63B 24/0003 434/252 |
| 2003/0147466 A1* | 8/2003 | Liang | H04N 19/149 375/240.12 |
| 2006/0166737 A1 | 7/2006 | Bentley | |
| 2007/0157226 A1 | 7/2007 | Misra | |
| 2008/0005231 A1 | 1/2008 | Kelley et al. | |
| 2008/0100731 A1 | 5/2008 | Moscovitch | |
| 2008/0192116 A1 | 8/2008 | Tamir et al. | |
| 2008/0214903 A1 | 9/2008 | Orbach | |
| 2010/0026809 A1 | 2/2010 | Curry | |
| 2010/0114671 A1* | 5/2010 | Bobbitt | G06Q 10/063114 705/7.15 |
| 2010/0191689 A1* | 7/2010 | Cortes | G06F 17/30784 706/46 |
| 2011/0173249 A1* | 7/2011 | Lee | H04W 72/005 709/203 |
| 2011/0199372 A1 | 8/2011 | Porter et al. | |
| 2011/0263946 A1* | 10/2011 | el Kaliouby | A61B 5/1128 600/300 |
| 2011/0276396 A1* | 11/2011 | Rathod | G06F 17/30867 705/14.49 |
| 2012/0041956 A1 | 2/2012 | Smith-Semedo et al. | |
| 2013/0250115 A1* | 9/2013 | Fan | G06K 9/00771 348/150 |
| 2015/0208000 A1* | 7/2015 | Ojanpera | H04N 21/8549 386/278 |

FOREIGN PATENT DOCUMENTS

| | | |
|---|---|---|
| WO | 2007006083 | 1/2007 |
| WO | 2007099502 A2 | 9/2007 |

OTHER PUBLICATIONS

Kersten et al., A Feature Database for Multimedia Objects. CWI Amsterdam, 1998:9 pages.
Ahanger and Little, A Survey of Technologies for Parsing and Indexing Digital Video. MCL Technical Report., Boston University, Nov. 1, 1995:1-35.
Thiel et al., Can Rule-Based Indexing Support Concept-Based Multimedia Retrieval in Digital Libraries? Some Experimental Results. German National Research Center for Information Technology, IPSI, D-64293 Darmstadt, Germany, Apr. 1999:1-11.
Flinchbaugh et al., Robust Video Motion Detection and Event Recognition: DARPA Image Understanding Program. Texas Instruments Inc. 1996:1-4.
Etievent et al., Assisted video sequences indexing: shot detection and motion analysis based on interest points. Labo. Reconnaissance de Formes et Vision, Insa Lyon, INSA. 1999:1-10.
Ivanov et al., Video Surveillance of Interactions. paper for MIT media Lab., MIT Artificial Intelligence Lab., Feb. 1999:1-8.
Virtual Observer offers new possibilities for ergonomics research and skills training. NOLDUS, Apr. 21, 1998. accessed online at: http://www.noldus.com/news/virtual-observer-offers-new-possibilities-ergonomics-research-and-skills-training : 4 pages.
The International Preliminary Report on Patentability issued in PCT/IL2013/050162 dated Aug. 26, 2014.
Lecture slides prepared by Donato Campagnoli, published on server on Apr. 22, 2014, 111 pages.
The International Search Report issued in PCT/IL2013/050162 dated Jun. 26, 2013.
Zhu et al., Player Action Recognition in Broadcast Tennis Video with Applications to Semantic Analysis of Sports Games. Proceedings of the 14th ACM international conference on Multimedia, 2006:431-440.
Terroba et al., Tactical Analysis Modeling through Data Mining—Pattern Discovery in Racket Sports. Proceedings of be International Conference on Knowledge Discovery and Information Retrieval, The University of Leiden, the Netherlands, 2010:6 pages.
Kokaram et al., Browsing Sports Video—Trends in sports-related indexing and retrieval work. IEEE Signal Processing Magazine, Mar. 2006:47-58.

\* cited by examiner

SMART-COURT SYSTEM AND METHOD FOR PROVIDING REAL-TIME DEBRIEFING AND TRAINING SERVICES OF SPORT GAMES

CROSS-REFERENCE TO RELATED APPLICATIONS

The present invention is filed under 35 U.S.C. § 371 as the U.S. national phase of International Application No. PCT/IL2013/050162, filed 21 Feb. 2013, which designated the United States and claims the benefit of priority to U.S. Provisional Application No. 61/602,360 filed Feb. 23, 2012, the entire contents of which are incorporated herein for all purposes.

BACKGROUND

1. Technical Field

The present invention relates generally to analysis of motion and activities of an object that is involved in a real sport game. More particularly, the present invention relates to classification and analysis of a real sport game session.

Discussion of Related Art

Participants of real sport games as well as coaches are in an ongoing effort to improve the activity and capability of the participants in the sport games. For that purpose, various analysis systems exist in the art.

Some of the analysis systems that exist in the market require from participants of the real sport games to be equipped with an electronic sensing device. Also, some of the analysis systems use a large array of cameras, which require a dedicated operator and a long setup and calibration process. Because of these requirements these analysis systems are considered to be very complicated and expensive.

Furthermore, video analysis systems that currently exist in the market require long preparation period before the video analysis can take place. For example, such preparations process may include manual recording, calibration procedure and uploading of footage. Also, these systems require a user to invest time in watching and analyzing unedited videos and manual tagging of various events that took place during the training or match sessions, since the events that are of interest to participants and coaches are not grouped together.

BRIEF SUMMARY

According to some embodiments of the present invention, a Smart-court system, adaptive to constrained sport environment, for enabling real time analysis and debriefing of sport activities is provided herein. The Smart-court system is comprised of: (i) an automatic recording system comprising a plurality of video cameras that are located in a court, arranged to real-time (RT) recording of a sport session and utilizing an automatic calibration and stabilization module requiring no human intervention; and (ii) a data processing system that is comprised of: (a) a capture module for grabbing a video stream of the RT sport session; (b) an objects' detector module that is arranged to receive a stream of video of the tracked objects and extract, during the RT sport session, the objects from the foreground of each frame; (c) an event module for automatically analyzing, during the RT sport game, the motion and the activities of the tracked objects that appear in the stream of multimedia data for automatically identifying and classifying events based on the tracking and analysis of the motion and the activities of the tracked objects, creating a synchronized event log and calculating statistics that occurred during the RT sport session; and (d) a presentation module enabling to perform instant debriefing, combined biomechanical and tactical analysis of the video by selectively playing specific events by type based on the synchronized event log.

According to some embodiments of the present invention, the smart court system is further comprising a tracking module for identifying in real time basic events enabling to identify a game session starting with a stroke and ending when one of the players gained a score, wherein the event module enables to identify complex events in near real time at the end of each session during the game match.

According to some embodiments of the present invention, the online video associated with event log is uploaded and published in one or more social networks.

According to some embodiments of the present invention, the event module is further arranged to yield a pattern of behavior and a tactical behavior of a player from more than one event.

According to some embodiments of the present invention, the data processing system is further generating a profile of the player including information related to: the player's tactical behavior, the pattern of behavior, game statistics, calculated success rate in comparison with other players and events.

According to some embodiments of the present invention, camera calibration is enabled by dividing a court into grids and checking each junction of in the grid for a deviation and wherein the deviation is identified in the grid than the frame in the streamed video may be checked in the streamed video.

According to some embodiments of the present invention, the data processing system identify start and end of a real sport game or real training and automatically identify change of status of the real sport game.

According to some embodiments of the present invention, the video that is transmitted from the cameras is automatically customized to adjust to environment conditions and does not require an intervention of an operator.

According to some embodiments of the present invention, vibration in the stream of video is automatically reduced.

According to some embodiments of the present invention, the data processing module further enables to create automatic customized video movie by integrating event or segments according to given criteria which are determined by the user or predefined by the system.

According to some embodiments of the present invention, change of designated location of players is identified when the players switch sides on the court.

According to some embodiments of the present invention, an additional techniques and strategies module provides recommendations to a player how to correct activity in a real sport game based on events' analysis.

According to some embodiments of the present invention, events' analysis and pattern behavior enable cutting out idle time in the video file to save storage space.

According to some embodiments of the present invention, the presentation module enable playing abridged video which displays only selected specified events by jumping between the events according to user query based on the synchronized log event.

According to some embodiments of the present invention, the presentation module enables playing a virtual 3D dynamic scenes using a 3D engine which simulates objects behavior based on analyzed video data of objects motion and the synchronized event log.

According to some embodiments of the present invention, the pattern behavior of the player is further analyzed to identify mental events.

According to some embodiments of the present invention, a method for enabling real time analysis and debriefing of sport activities in a Smart-court system that is adaptive to constrained sport environment is provided herein. The method is comprised of the following stages: (i) automatically recording in real time (RT) a real sport session by utilizing an automatic calibration and stabilization module requiring no human intervention by a system that is comprising a plurality of video cameras that are located in a court; (ii) tracking motion and the activities of objects in a video of the RT sport session by a tracking module; (iii) receiving a stream of video of the tracked objects and simultaneously analyzing, during the RT sport session, the motion and the activities of the tracked objects that appear in the stream of video; (iv) automatically identifying and classifying events based on the tracking and analysis of the motion and the activities of the tracked objects and calculating statistics that occurred during the RT sport session; and (v) creating a synchronized event log of the classified events, wherein a user is enabled to perform instant debriefing, combined biomechanical and tactical analysis of the video by selectively playing specific events by type based on the synchronized event log.

According to some embodiments of the present invention, basic events are identified in real time, for identifying game session starting with a stroke and ending when one of the players gained a score, wherein complex events are identified near real time at end of each session during the game match.

According to some embodiments of the present invention, the method is further playing an abridged video by jumping between different events based on a user query according to the synchronized event log.

According to some embodiments of the present invention, the method is further including publishing and uploading, game statistics, the online video and associated event log in one or more social networks.

According to some embodiments of the present invention, the method is further yielding a pattern of behavior and a tactical behavior of a player from more than one event by the analysis module.

According to some embodiments of the present invention, the method is further generating and uploading to the network a profile of the player and saving information related to: the player's tactical behavior, the pattern of behavior, performance statistics and events by the data processing system.

According to some embodiments of the present invention, the method is further identifying start and end of a real sport game or real training and automatically identify change of status of the real sport game by the data processing system.

According to some embodiments of the present invention, the method is further automatically customizing the video that is transmitted from the cameras to adjust to environment conditions and does not require an intervention of an operator.

According to some embodiments of the present invention, the method is further automatically reducing vibration in the stream of video.

According to some embodiments of the present invention, the method is further identifying the change of status by a predefined gesture of the user.

According to some embodiments of the present invention, the method is further identifying change of designated location of players, when the players switch sides on the court.

According to some embodiments of the present invention, the method is further providing recommendations to a player how to correct activity in a real sport game based on events' analysis by an additional techniques and strategies module.

According to some embodiments of the present invention, the method is further cutting out idle time in the video file to save storage space by events' analysis and pattern behavior.

According to some embodiments of the present invention, the method is further playing an abridged video which includes specified events.

According to some embodiments of the present invention, the method is further playing a virtual 3D dynamic scenes based on the videos using 3D engine to simulate objects behavior based analyzed motion data of objects and the synchronized event log.

According to some embodiments of the present invention, the method is further analyzing pattern behavior and tactical behavior to identify a mental event of the player.

According to some embodiments of the present invention, the method is further comprising the step of creating customized video movie by integrating event or segments according to given criteria which are determined by the user or predefined by the system.

According to some embodiments of the present invention, the method is further comprising the step of identifying unforced error based on identifying the timing and position of the player before striking the ball.

According to some embodiments of the present invention, the method is further comprising the step of real time automatic calculation of game score based on identified classified events and analysis of player and ball position and motion.

According to some embodiments of the present invention, the method is further comprising the step of comparing between the players' profiles and providing performance matching between players.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The present invention will be more readily understood from the detailed description of embodiments thereof made in conjunction with the accompanying drawings of which.

DETAILED DESCRIPTION

Figure 1A:
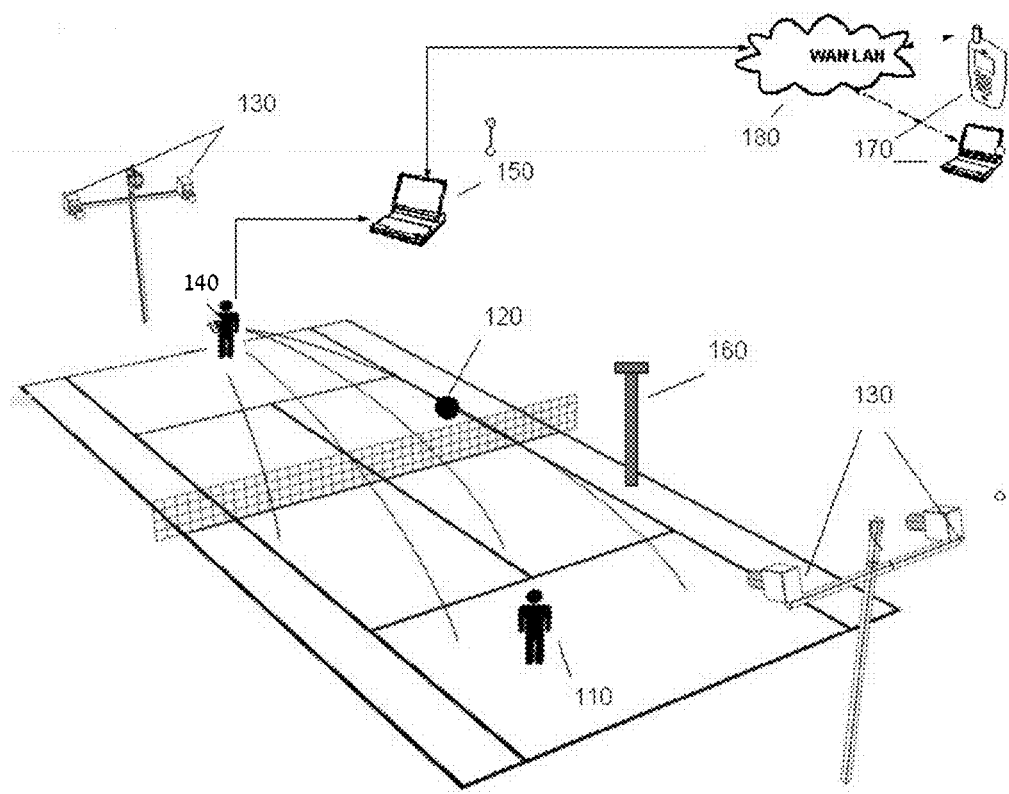
FIG. 1A is a top 3D perspective diagram of a system incorporated in a Tennis court, according to some embodiments of the invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The term "event" as used herein in this application is defined as a at least one action which occur during a real sport game as recorded in a multimedia file. The beginning and the end of the event is updated in event log file. Also, various parameters which are related to the event are saved in the log event file.

The term "classification of event" as used herein in this application is defined as an attribution of an event to a predefined type of sequence of actions that occur in a real sport game. The classification of the event is a result of an analysis of the event and it is saved in the database.

The term "tactical behavior" as used herein in this application is defined as a result of analysis of a pattern of behavior of a player according to more than one event. The pattern of behavior may be classified according to a predefined list of tactical behavior types and the classification of the tactical behavior is saved in the database along with the players' profile and other details of the real sport game.

The term "profile" as used herein in this application is defined as a collection of parameters which are related to a real player in a real sport game.

The term "T Point" as used herein in this application is defined as the spot on a tennis court where the center line and the service line intersect perpendicularly to form a "T" shape.

The term "session" as used herein in this application is defined as a segment in a real sport game which starts in a strike and ends in earned points.

The term "near real-time" (NRT), as used herein in this application is defined as a delay that is introduced by automated data processing between the occurrence of an event and the use of the processed data. For example, classifying an event as a near real-time event refers to the real time of event occurrence, minus the processing time, as nearly the time of the live event.

According to some embodiments of the present invention, a system for enabling simultaneous analysis and debriefing of sport activities is provided herein. The system is enabling a user to track all events that occurred during an entire match (i.e. real sport game) or training. Furthermore, the system is providing automatic classification, analysis and understanding the events that occurred during a real sport game (i.e. a match) or training, for improving the performance of the player in the real sport game.

According to some embodiments of the present invention, the system may also record and analyze activity and motion of a tennis player and other objects which are related to the real sport game, by utilizing streamed data.

According to some embodiments of the present invention, there is provided a data processing system. The data processing system may be arranged to receive a stream of video of a real time (RT) sport session and to simultaneously analyze, during the sport session, motion and actions of objects that appear in the streamed multimedia file.

According to some embodiments of the present invention, the system is implemented by utilizing a smart-court platform that is adaptive to a constrained sport environment. The constrained sport environment is including at least two cameras, preferably four cameras, for recording the real sport game. A constrained sport environment may be a swimming pool, a football field, a tennis court etc. For the purpose of explaining the present invention, we will refer in a non limiting example to a tennis game or tennis training as a real sport game.

According to some embodiments of the invention, vision and image processing algorithms are applied for analysis of events that occurred in the real sport game.

Embodiments of the present invention provide a smart-court platform for analyzing patterns of behavior of an object that is participating in a real sport game and classifying the patterns. The smart-court platform is receiving a multimedia stream of the sport game from cameras which are located in the place where the real sport game is taking place. The system may automatically record and analyze a pattern of tactical behavior and then classify it.

According to some embodiments of the present invention, the system provides calculations of game statistics such as: (i) player's and ball's position in various positions; (ii) player's speed; (iii) player's mileage calculation; (iv) player's acceleration; (v) ball's location and spin; (vi) number of winners; (vii) number of double fault; and (viii) serve percentage, speed, position and points on first serve i.e. whether the player won the point after the serve.

The game statistics may be calculated in real time and may be updated in real time throughout the sport game.

According to some embodiments of the present invention, the system automatically classifies events that took place during an entire match or training i.e. session, including: player behavior related events or game rules, session events including: (a) types and order of strokes, (b) net approach; (c) passing shot; (d) slice; and (e) aces, (f) successfully gained points; (g) game type; (h) match; (i) tactical patterns; (g) forced error; and (h) unforced error. An unforced error is a description of poor performance of a player and may be identified in relation to a player's profile.

The unforced error may be detected by analyzing the player's position and timing before striking the ball, in case the player has reached the point and position where the player can strike the ball, at least specified amount of time (e.g. one second) before the ball and fails in her or his performance, an unforced error is identified. In case the player reached the striking point less than said specified amount of time (E.g. one second) and fails, a forced error is identified. This algorithm of identifying forced and unforced error is based on analysis of an accurate identification of the positions and motion of objects (i.e. players and balls) at all frames. The system may provide a detailed analysis of: (i) all the serves that hit the T point, Wide point or body point (each serve can be close to serve line or to the net); and (ii) all the serves above certain speed. Type of strokes may include: (i) first and second serve; (ii) backhand; (iii) forehand, including: inside out and passing shots; (iv) forehand and backhand volley; (v) nets; (vi) first and second return; (vii) smash.

According to some embodiments of the present invention, the system may further provide an analysis by pattern of: (i) different combo; (ii) rally; (iii) data of all points that were gained at second serves; (iv) a tactical pattern e.g. "Serve-Return-Forehand"; (v) player's position (The position may be presented in a color map) (vi) serve and run; and (vii) all rallies above a certain amount of strokes.

According to some embodiments of the present invention, the system may further provide an analysis by score. For example, (i) keep score (ii) analysis according to specific score in a game; (iii) ending score in a session; (iv) big points; (v) outs and nets; and (vi) leading and behind states.

According to some embodiments of the present invention, the analysis may be performed for identifying and classifying events that occurred during an entire session. Further, the analysis may result in an online edited video version of the RT sport session. Additionally, a user may be enabled to perform debriefing and analysis operation by selecting to review specific events by their type according to the event log.

According to some embodiments of the present invention, an access to all events of the same type may be achieved via: (i) a clip with a sequence of all events from the same type, or (ii) an abridged video which utilizes events' log file, where a user may "jump" between all events which are from the same type. Each event in the events log file may include indication of a start point of an event and an end point of the event. Skipping between events may be enabled to the user based on automatic classification and tagging of beginning and end of each event. Each event may be associated to data including a type name according to classification of the event, time tag, one or more players that are associated to the event and event result.

According to some embodiments of the present invention, there is provided an immediate feedback process which does not require pre or post game manual processing for breaking of a session into classified events. The automatic event classification process allows a player and a coach to watch the events and debrief only the events of interest. Additionally, such feedback provides an efficient and focused training process.

According to some embodiments of the present invention, the debriefing is performed via a visualization and feedback dashboard which provide the user with following information: game's statistics, events' analysis, game' video, events' log and a 3D animated virtual dynamic scenes which show three dimensional (3D) graphics display, based on the player's location and stroke classification, including ball's movement.

According to some embodiments of the present invention, an analysis of the entire match (i.e. sport game), the strategy and key points is provided herein. The analysis is also performed to present a combined biomechanical and 3D tactical analysis, in a synchronized video and 3D virtual display. Biomechanics aspects of the match include the movement analysis of the player for improving the player's action behavior such as hand movement when preforming a strokes etc.

According to some embodiments of the present invention, data collection may be achieved in a non-intrusive manner. It does not interfere with the game's action and it does not require the player wearing a sensor during a match (i.e. real sport game) or training. In the 3D virtual dynamic scenes the player and ball position, the players' footwork, the ball's trail and hit point on the ground are displayed. The 3D virtual dynamic scenes may be presented and displayed various viewing modes: top view, side view, from the ball's point of view and from the player's point of view. The 3D virtual dynamic scenes may be displayed from the point of view of the opponent player.

Optionally, the system may create an attributed profile of the object, based on at least one pattern of tactical behavior. The attributed profile may include performance data such as speed of ball strokes, results' statistics, and motion pattern across the court etc. The system may enable a real-time upload of (i) the stored position; and (ii) the identified motion.

Utilizing cloud computing services or any other technology, the data that was uploaded may be accessible from any place via the Internet on any type of computer device such as laptops, tablets, smartphones and the like. Players and coaches will be able to conduct remote debriefing and to provide remote guidance in RT. In other words, virtual coaching may be provided.

Additionally, the system may perform a combined and synchronized biomechanical analysis and 3D tactical analysis of: (i) full game; (ii) strategy e.g. number of hits, type of stroke, location of hits and the like; (iii) score; and (iv) match scoring patterns such as big points. The biomechanical analysis may be performed by combining (i) a type or strength of stroke; (ii) type of motion or location of the tennis player in the court; and (iii) type of behavioral pattern according to match scoring patterns.

Additionally, embodiments of the present invention provide relatively inexpensive system that may perform, without an operator, a preliminary setup or corrections during the event, the following actions: (i) automatic calibration of cameras by identifying field boundaries; (ii) automatic customization of light in the stream of video, according to: (a) day and night lighting; and (b) weather conditions; (iii) automatic reduction of vibration in the stream of video; (iv) automatic identification of start of the real sport game; (v) automatic identification of end of set; and (vi) automatic identification of end of the real sport game. The system may utilize at least one computer device.

According to some embodiments of the present invention, there is provided an automatic procedure of uploading of debriefing data to an internet page of a player, and sharing performance of the player by providing access to the debriefing data from any location via the Internet or any wireless network by laptops, tablets, smartphones etc. Further, remote debriefing may be available to players and coaches, thus offering guidance in RT.

Furthermore, a dynamic updated database and a social network of athletes and sport players may create a platform for sport players to share data with their coach, friends and family. The database may include for example, clips of special events and statistics. Also, the database may be used as a scouting tool for scouts, coaches and players.

According to some embodiments of the present invention, the smart-court system may be implemented in multiple courts and all smart-court systems may be connected to one or more social networks and players' databases.

Moreover, embodiments of the present invention provide a system that enables automatic profile generation according to performance of a Tennis player during a game or during a series of games. The profile of the Tennis player that was generated may be used for: (i) scouting for new talents; and (ii) finding a partner according to specified parameters. A social network of tennis players may be generated to allow sharing data with other players, a coach, friends and family via clips; special events and statistics e.g. speed of ball. Also, the system may be used as a learning tool for players. The system may send automatic notifications to scouts and to coaches, through the social network, according to update of players' performance parameters.

The generated profile of the real player may be published in the social network of tennis players. Talent scouting may be performed by utilizing the published profile as well as partner matching. For example, a real player that is aware of her or his Tennis techniques that require improvement may search a partner that possesses a higher level in these specific Tennis techniques.

FIG. 1A is a top 3D perspective view diagram of a system that is incorporated in a Tennis court, according to some embodiments of the invention. In a non-limiting example, the system may be incorporated in a Tennis court. A real player 110 may be training or competing against a real player 140 with a Tennis ball 120.

According to one aspect of the present invention, four cameras 130 may be utilized to monitor a 3D area within and around a game's court to capture motion and activities of real Tennis players 110 and 140 and of the ball 120. The cameras 130 may be megapixel cameras. When the system is being activated, the video pixels that were captured are translated by processor 150 into 3D coordinates for identifying the spatial location of the monitored objects. Based on said identified locations, the video data is processed for tracking the movement of the Tennis ball 120 and the real players 110 and 140. The real players are not required to be equipped with an electronic sensing device. Since pixel coordinates are known, automatic zoom on video is enabled.

According to some embodiments of the invention, camera calibration may be enabled for each frame. The court may be divided into grids so only junctions of the grids are being checked. If a deviation is identified in a grid than the frame may be checked for calibration. A slow frame may have a slow background and a fast frame may have a fast background.

According to another aspect of the invention, at least two cameras, preferably four cameras 130 may be automatically calibrated, according to identification of boundaries of the court. The automated calibration may not require an intervention of an operator. The cameras 130 may track the real players 110 and 140 and the Tennis ball 120 in an accurate and reliable manner on any surface.

Furthermore, the stream of multimedia data (i.e. video) that is transmitted from the cameras 130, may be automatically customized and may not require an intervention of an operator, according to: (a) day and night lighting or artificial floodlight; and (b) weather conditions, for example, in windy weather the cameras 130 may wobble and the multimedia data that is transmitted might need to be fixed; and (c) shadow covering parts or most of the court. The system may also, automatically reduce vibration in the stream of video.

According to some embodiments of the invention, start and end of a real sport game or real training may be automatically identified by the system. Furthermore, the system may automatically identify change of game status, and may not require an intervention of an operator, by identifying, for example, a predefined gesture of the real players 110 and 140. The system may identify change of location of players 110 and 140 when the real players 110 and 140 switch sides on the court. Also, the system may identify a repeated serve.

According to another aspect of the invention, the system may analyze a pattern of behavior of real players 110 and 140 in a multimedia stream. The system may perform an analysis by receiving a stream of a video of the real sport game in RT. Next, the system may identify and tag the position and the motion of real players 110 and 140, according to classification rules. The classification rules may be based on tactical behavior pattern analysis of the position and motion of real players 110 and 140.

Further, the system may enable a review of at least one of the objects' specified: (i) position; (ii) motion; and activity, according to the classification. Furthermore, the system may store one or more tags which are static information related to classified events the pattern of tactical behavior. Information regarding activity of the real players may include: (i) type of stroke; (ii) left or right hand usage; and (iii) strength of stroke.

According to yet another aspect of the invention, the system may provide recommendations to a player how to correct his or her stroke and/or game management and tactics thus, utilized as a learning tool of techniques and strategies.

According to yet another aspect of the invention, the system's capability to understand the course of the Tennis play based on identifying and classifying events may contribute in cutting out idle time in the video file to save storage space. A Tennis match video includes long periods of idle time between games' session, where there is not activity of the players which is relevant to the game. The system may identify the idle time and extract it from the video hence, reducing the size of the video file, reducing storage, bandwidth and upload and download resources and cost.

According to yet another aspect of the invention, the system may play an abridged video or virtual 3D dynamic scenes representing the video game sessions, in which the pattern of tactical behavior of the real players 110 and 140 may be presented. The video and the related virtual 3D dynamic scenes may be displayed simultaneously on the same screen, enabling the user to analyze the game both strategically by reviewing the motion across the screen at the virtual 3D dynamic scene version, and analyzing biomechanical motion of part of the body at the video file. The abridged video or virtual 3D dynamic scenes can be played according to a user query for displaying only events of specific type, for example, showing all backend strokes through the game.

According to some embodiments of the invention, the user query may be more specific by requesting all backend strokes at the front area of the court. Accordingly, a customized video (i.e. clip) may be created including aggregation of events of specific type enabling the player and coach to focus in specific type of events. The clip may be uploaded to the social network and be accessed via the internet or it may be viewed and/or physically received on court.

According to yet another aspect of the invention, the customized video may be generated by a specified criterion or event. For example, generating a video with all successful backhands in a real sport game or in a series of games. In another example, generating a video of all successful forehands of all champion players from different geographical places.

According to yet another aspect of the invention, the system may create an attribute profile of at least one of the real players 110 and 140 based on at least one pattern of behavior and log of events. The pattern of behavior may further be analyzed to identify a mental event. An example of a mental event that the system may recognize is when a real player is angry. Another mental event that the system may recognize may be a decline in the performance of the players and conclude that it may be due to a mental event. A delay in performance of a player or repeatedly wiping sweat from a racket may also be interpreted as related to a mental event.

According to yet another aspect of the invention, the system is arranged to be an integral part of a Tennis court. Further, the system may be fully adaptable to both indoor and outdoor courts.

According to some embodiments of the present invention the real time analysis of events during the real sport game may be used for enouncing or displaying the game results for the players and the audience that is watching the game via remote terminal 170. The real time analysis may be transferred via data communication link 136.

Optionally, the data related to the event may be used for supporting line calling decisions of a human umpire or as an objective officiating tool. For example, the tool may provide accessible debriefing and analysis capabilities combined with line-calling, to determine if a ball was inside the court or not, in a Tennis game. The streamed data may be (i) location, speed of the tennis player or a ball and acceleration of a player or a ball; (ii) type or speed of a tennis stroke; (iii) result of success or failure at the game to the player; and (iv) data related to score that were gained in the game in real time. Data about the scoring system is transmitted in real time. For example, type of points that were gained during the real sport game or training.

Figure 1B:
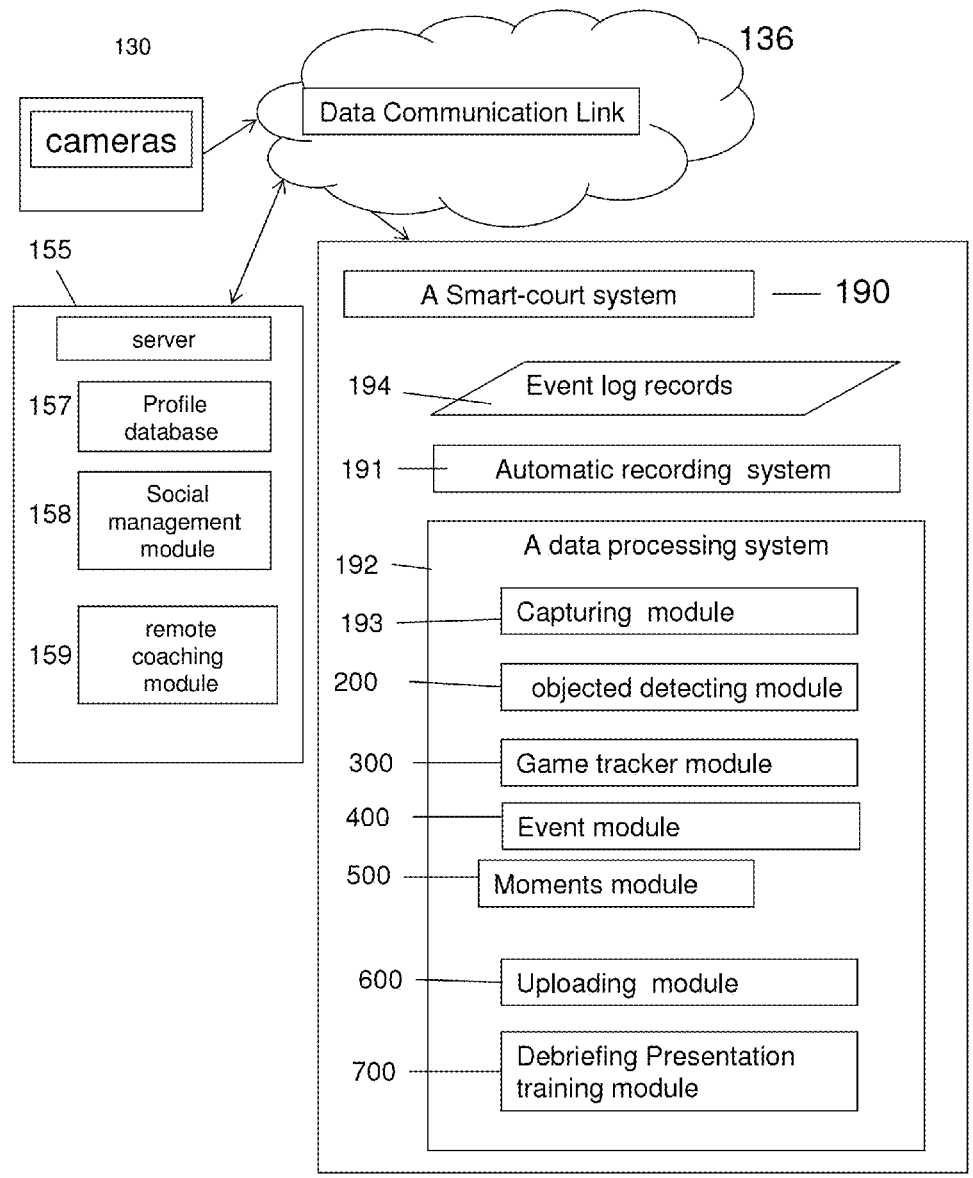
FIG. 1B is a block diagram of a smart-court system, according to some embodiments of the invention.

FIG. 1B is a block diagram of a smart-court system, according to some embodiments of the invention.

According to some embodiments of the invention, a smart-court system 190 may be connected to cameras 130 via a data communication link 136. The smart-court system 190 may be comprised of an automatic recording system 191 which automatically record and analyze a pattern of tactical behavior and then classify it, an event log file 194 and a data processing system 192.

According to some embodiments of the invention, the data processing system 192 may be comprised of the following modules: (i) a capturing module 193 for grabbing the video of the RT sport session and encoding it; (ii) object detection module 200 (described in details in FIG. 2); (iii) a game tracker event 300 for identifying basic events; (iv) an event module 400 for automatically identifying and classifying events based on the tracking and analysis of the motion and the activities of the tracked objects and calculating statistics that occurred during the RT sport session; (v) a moments module 500 for creating customized video (see FIG. 5); (vi) an uploading module 600 for uploading profiles and video to the network; and (vii) debriefing presentation training module 700 for enabling a user to watch the clip with the sequence of all events from the same type or to watch the abridged video.

According to some embodiments of the invention, a server 155 may be connected to the smart court system via data communication link 136. The server may be comprised of: (i) a profile database 157; (ii) social management module 158 for managing social activity between the players; and (iii) a remote coaching module 159 enabling coaching by view the game video at remote location.

Figure 2:
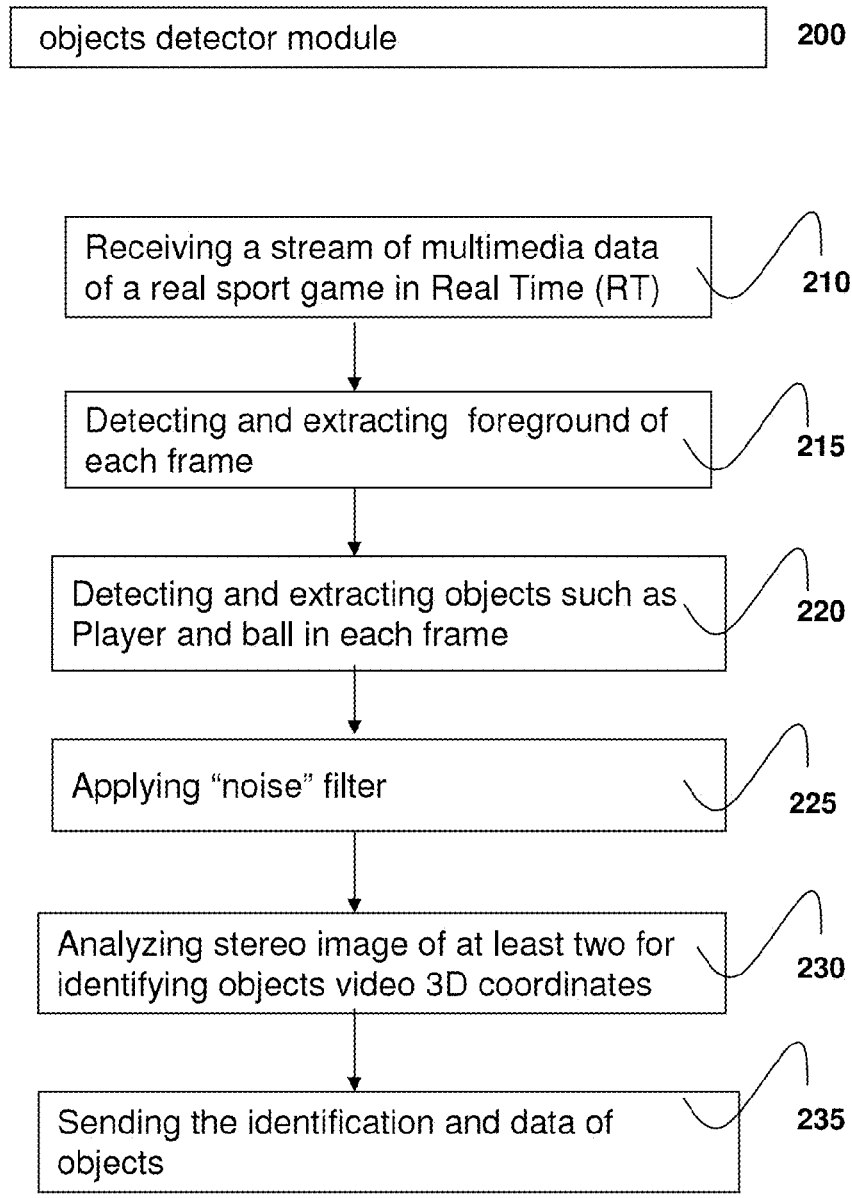
FIG. 2 is a flowchart diagram of objects detecting module, according to some embodiments of the invention.

FIG. 2 is a flowchart diagram of object detection module 200 activity, according to some embodiments of the invention.

According to an aspect of the present invention, the object detection module may begin with receiving a stream of multimedia data of a real sport game in Real Time (RT) (stage 210) from the capturing module 193. In each frame analysis the objects (i.e. players or ball) may be extracted from the background: first the foreground of each frame is identified and extracted from the frame image. (stage 215). Optionally, the background of the image can be identified and extracted in some of the frames, as the background of the frame does not change from frame to frame it may be detected each specified amount of time.

At the next stage the objects are detected and extracted (the players and the ball) in each frame (stage 220). Optionally, "noise" filter is applied (stage 225) and identification of the objects video 3D coordinates is performed by analyzing stereo image of at least two cameras (stage 230).

Finally sending the identification and data of objects to a tracking module (stage 235).

Figure 3:
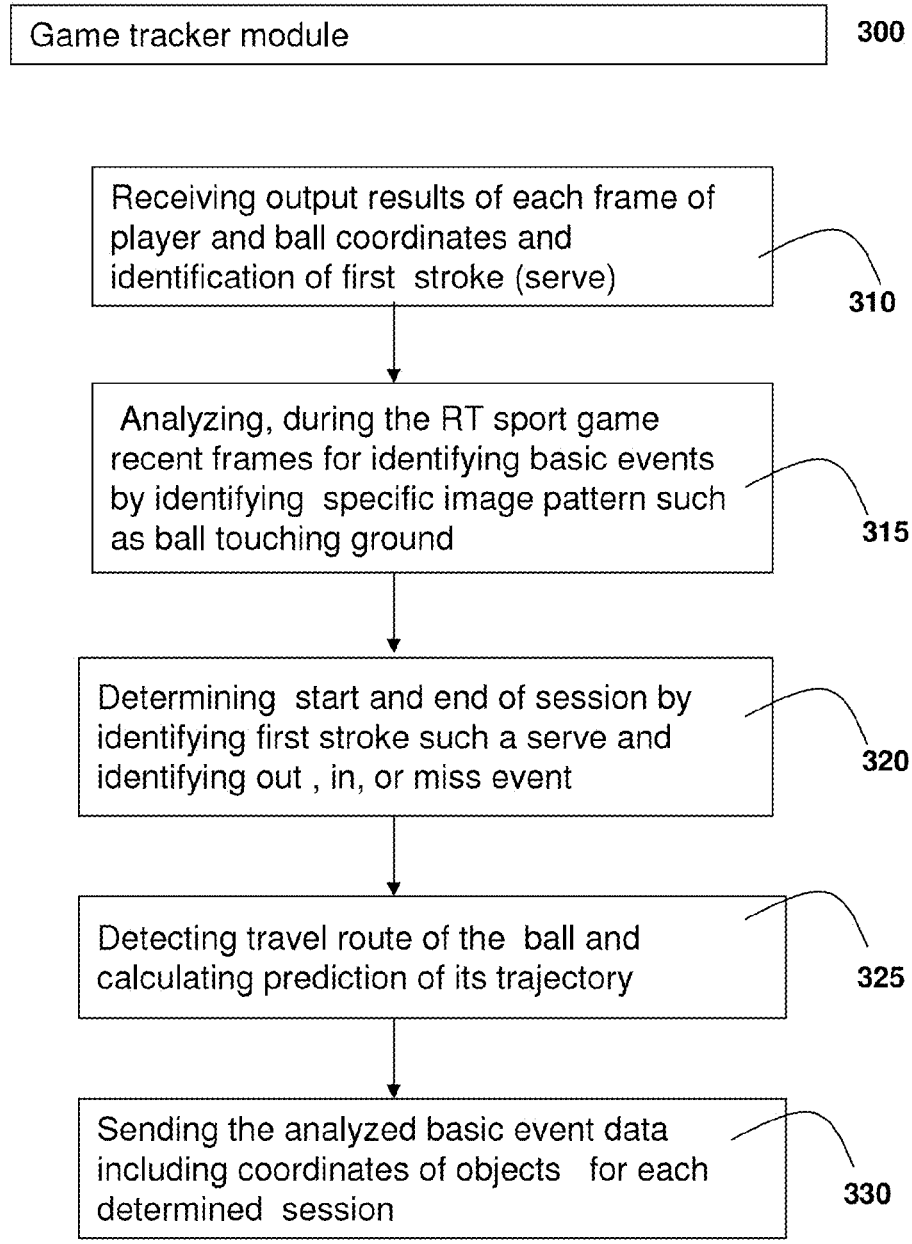
FIG. 3 is a flowchart diagram illustrating activity of game tracker module, according to some embodiments of the invention.

FIG. 3 is a flowchart diagram illustrating system activity of game tracker module 300, according to some embodiments of the invention. The game tracker module 300 analyses frames to yield basic events such as a stroke or a serve for the purpose of identifying a session. For example, identifying when a player strikes a ball before the ball touched the ground. Additionally, the game tracker module 300 may also identify when the ball hit the net or when the ball fell out of the lines or when a user didn't respond to a ball that fell in the lines.

According to some embodiments of the invention, game tracker module 300 may begin with receiving output results of each frame of player and ball coordinates and identification of first stroke (serve) (stage 310). The game video recent frames are analyzed, during the RT sport game for identifying basic events by identifying specific image pattern such as ball touching ground stroke (stage 315) to determine start and end of session by identifying first stroke such a serve and identifying "out", in, or miss event (stage 320).

Optionally, the travel route of the ball is detected and prediction of its trajectory is calculated (stage 325).

At the end of each detected session, the analyzed basic event data including coordinates of objects for each determined session of detected basic events is conveyed to an event module (stage 330).

Figure 4:
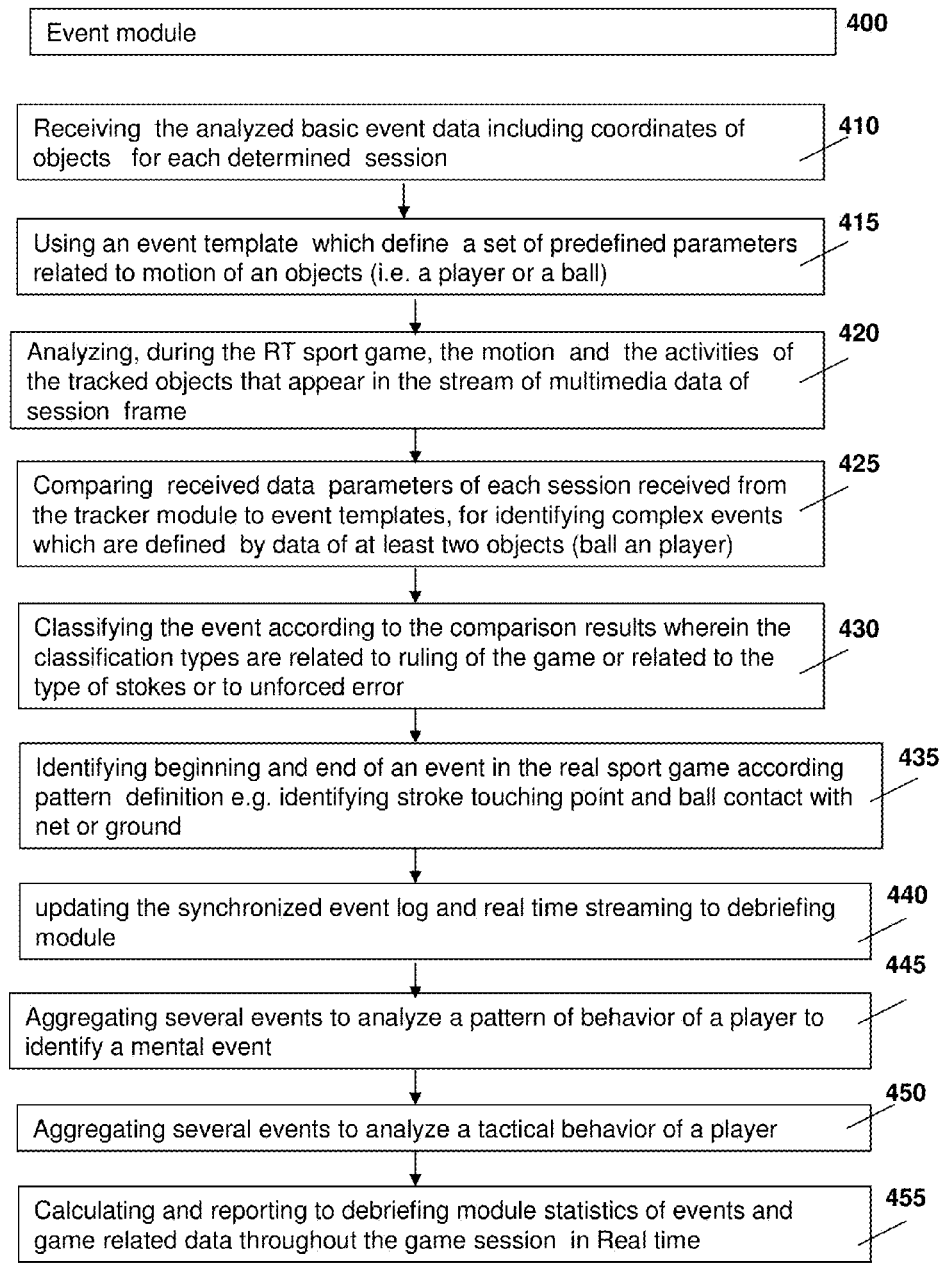
FIG. 4 is a flowchart diagram illustrating activity of event module, according to some embodiments of the invention.

FIG. 4 is a flowchart diagram illustrating activity of event module 400, according to some embodiments of the invention. The event module 400 may yield complicated events out of analysis of several frames. For example, types of strokes and unforced error. First, the analyzed basic event data including coordinates of objects for each determined session is received from the tracking module 300.

According to some embodiments of the invention, event module 400 may begin with using an event template which defines a set of predefined parameters related to motion of objects (i.e. a player or a ball) (stage 415).

At the next stage, the position motion and the activities of the tracked objects that appear in the stream of multimedia data of each frame are analyzed during the RT sport game (stage 420).

The received data parameters of each session received from the tracker module and the motion and activity analysis are compared to event templates parameters for identifying complex events in near real time. (stage 425).

Based on the comparison results, the events are classified, wherein the classification types are related to ruling of the game or related to the type of stokes or to unforced error (stage 430).

For each event, the timing of beginning and end are estimated and a synchronized log of the event is generated (stages 435, 440), according to pattern definition e.g. identifying stroke touching point and ball contact with the net or ground. Optionally, aggregating several classified events to analyze a pattern of behavior of a player to identify event characteristics such as a mental event (stage 445) or aggregating several classified events to analyze a tactical behavior of a player (stage 450).

Optionally, the event module 400 calculates and reports statistics of events and game related data throughout the game session (stage 455).

Figure 5:
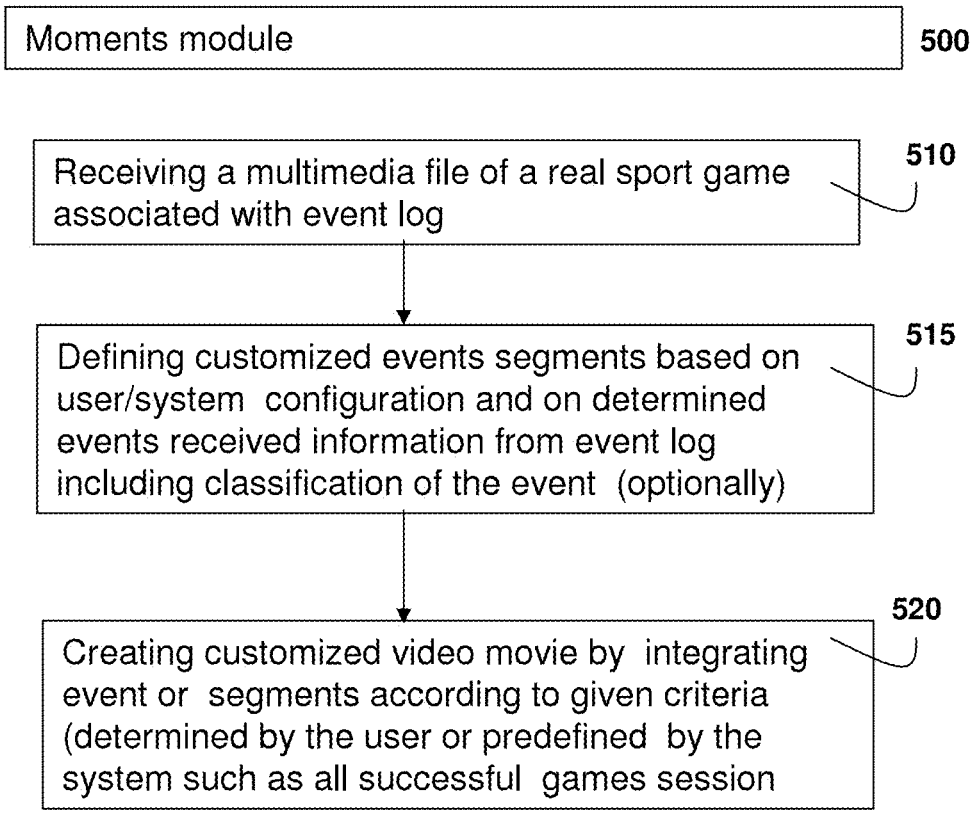
FIG. 5 is a flowchart diagram illustrating activity of moments module, according to some embodiments of the invention.

FIG. 5 is a flowchart diagram of Moments module 500, according to some embodiments of the invention.

According to some embodiments of the invention, a user may be enabled to configure preference of beginning and ending of an event. For example, one user may configure a beginning of backhand event when the player is moving her or his hand and another user may configure beginning of backhand event when the ball leaves the racket of the player.

The moments modules receives the multimedia file of a real sport game associated with event log(stage 510). Optionally, the module enables to define customized events segments based on user/system configuration and on determined events received information from event log including classification of the event (stage 515).

The module enables to create customized video movie by integrating event or segments of events according to given criteria which may be determined by the user or predefined by the system, such criteria may include selecting successful games session, fasted ball strikes, etc. (stage 520).

Figure 6:
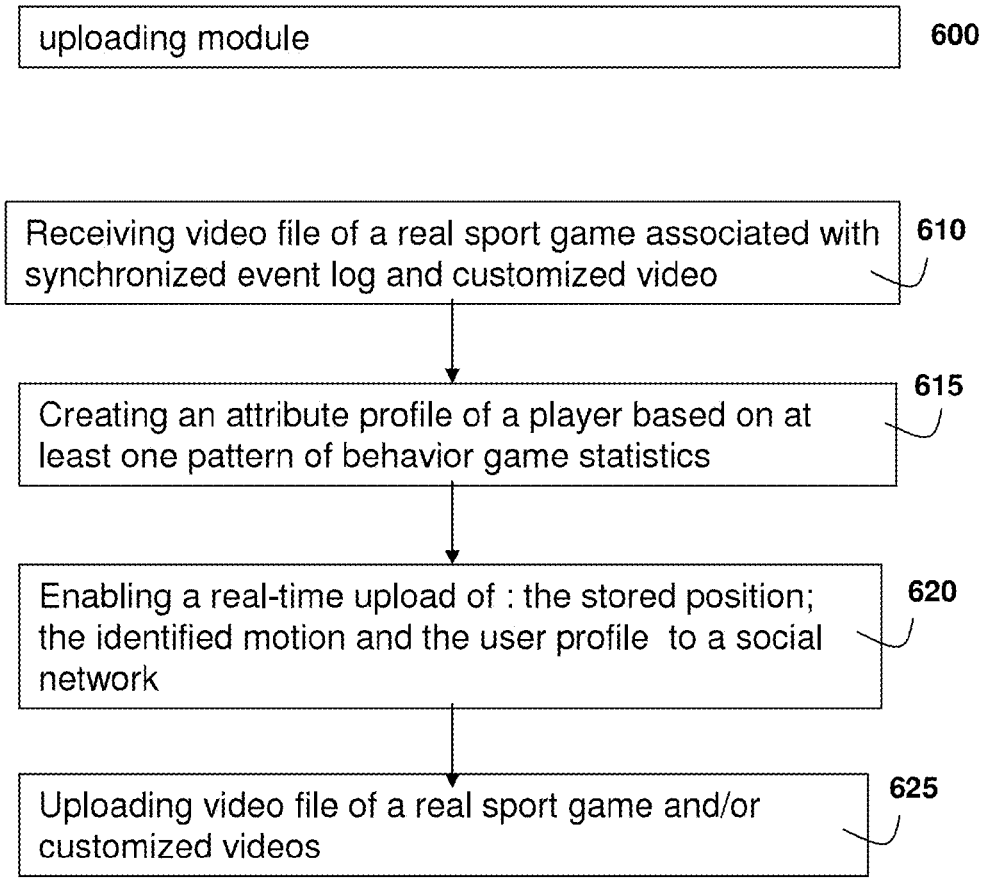
FIG. 6 is a flowchart diagram illustrating activity of upload module, according to some embodiments of the invention.

FIG. 6 is a flowchart diagram illustrating an uploading module 600, according to some embodiments of the invention.

According to an aspect of the present invention, after the real sport game is over, the following stages are taken: Receiving video file of a real sport game associated with synchronized event log and customized video (stage 610). Based on the game video, is created an attribute profile of an object based on events log analysis and at least one pattern of behavior to be published in a social network (stage 615) and the module enables a real-time upload of: the user profile, video file of a real sport game and/or customized videos to a social network (stages 620, 625).

Figure 7:
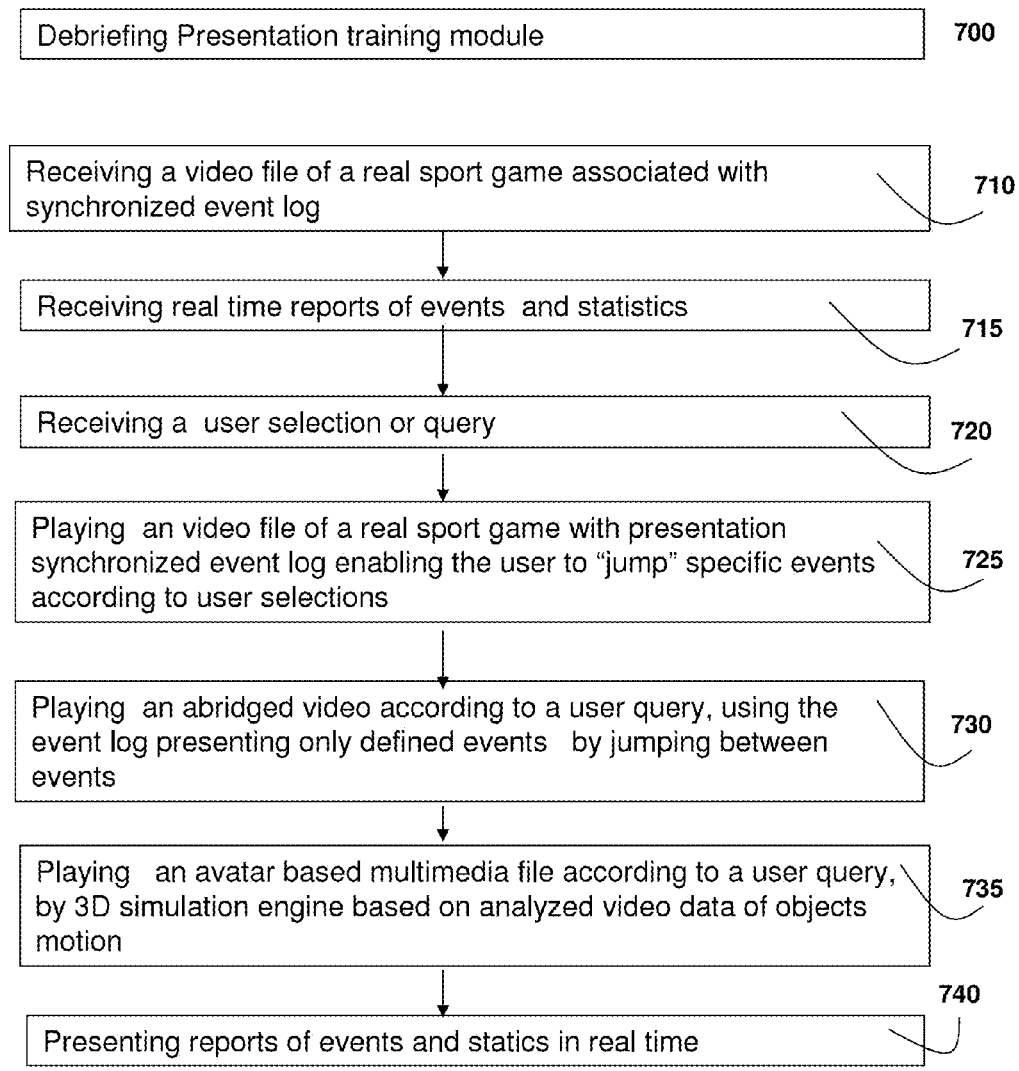
FIG. 7 is a flowchart diagram illustrating activity of Debriefing presentation training module, according to some embodiments of the invention.

FIG. 7 is a flowchart diagram illustrating activity of debriefing presentation training module 700, according to some embodiments of the invention.

First the debriefing presentation training module receives a video file of a real sport game associated with synchronized event log.

Throughout the game real time reports of events and statistics are received (stage 715) from the tracking module or the event module.

According to an aspect of the present invention, debriefing presentation training module 700 may receive a query from a user (720).

Optionally, the module plays a video file of a real sport game with synchronized event log enabling the user to "jump" between specific events according to user selections (stage 725).

Using the event log, an abridged video may be played per user query by jumping between requested events. The abridged video may present only scenarios including events related to the user query, such as, all strokes at the rear part of the court (730). Throughout the presentation of the abridged video of the session the user may "jump" from one marked event to the other based on the event log. According to user query based on analyzed video data of objects motion, a virtual 3D dynamic scenes movie can be played that is generated online or in real-time, using 3D engine which simulates players and ball motion (step 735). Optionally, the module presents reports of events and statics in real time by voice or by text appearing on the video (stage 740).

According to further embodiments of the present invention, the system comprises a pointing device (160, see FIG. 1) enabling to mark positions on the field ground for the purpose of indicating the position of the virtual opponent. The pointing device is controlled by a designated controller module, based on simulation of the opponent virtual player and/or predefined training programs. According to an optional embodiment, the pointing device can be a laser based device enabling to use a laser beam that continuously marks the location of the virtual opponent on the tennis court ground. According to another option the virtual opponent is indicated by a hologram.

According to yet another aspect of the invention, the system may include at least one tennis ball machine for projecting balls in a court for training purposes. The ball machine may be programmed to utilize the video game analysis for identifying player behavior and activate the ball machine for effective training of the player.

According to some embodiments of the present invention, the pattern analysis of the players' image can indicate on physical characteristics of the player such as the player's weight and calories that were lost throughout the game.

According to an aspect of the invention, tracking, identifying and capturing the motion of players and objects such as balls and rackets may be performed utilizing the following elements: (i) RT methods; (ii) smart cameras; (iii) image processing and patterns recognition; (iv) 3D objects localization and tracking; (v) human behavior modeling; (vi) 3D visualization (vii) video compression; and (viii) web cloud platform.

Further, the tool may provide: (i) a RT ball speed detection; (ii) an audio feedback, such as announcing game score or ball velocity; (iii) score measurement; (iv) in and out calculations; and (v) an immediate video playback.

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Furthermore, it is to be understood that the invention can be carried out or practiced in various ways and that the invention can be implemented in embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

What is claimed is:

1. A Smart-court system, comprising:
   an automatic recording system comprising a plurality of video cameras, arranged for capturing a sport session in a video stream, and
   a data processing system comprising a computer programmed to implement:
   a capture module for receiving the video stream of the sport session;
   an object detector module, for extracting simultaneously to said receiving of the video stream of the sport session, a plurality of objects from frames of the video stream, thereby tracking the objects appearing in the video stream;

an event module for automatically analyzing, during the sport session, motion and activities of the tracked objects, the motion and activities comprising at least two interactions between a ball and an object, for automatically identifying events and classifying the identified events into types based on said tracking and analysis, and for creating a synchronized event log of the classified events based on said identifying and classifying; and a presentation module for enabling a user to combine biomechanical and tactical analysis of the video stream by selectively playing at least one of the identified events classified into the types, by type, based on the synchronized event log.

2. The smart court system of claim 1, further comprising a tracking module configured to identify in real time a part of the sport session, the part starting with a stroke and ending when a player gains a score.

3. The Smart-court system of claim 1, wherein the computer is further configured to upload and publish an online video associated with the synchronized event log on a social network.

4. The Smart-court system of claim 1, wherein one of the tracked objects is a player and the event module is further configured by programming the computer, to yield a pattern of behavior and a tactical behavior of the player from the identified events.

5. The Smart-court system of claim 4, wherein the computer is further programmed to generate a profile of the player, the profile comprising information based on the yielded tactical behavior and the yielded pattern of behavior.

6. The Smart-court system of claim 1, wherein said automatic recording system is further configured to perform automatic calibration by dividing a court as appearing in the video stream using at least one grid, and in each frame of the video stream, checking the grid for deviation of the court lines from the grid.

7. The Smart-court system of claim 1, wherein the computer is further configured to identify a start and end of a sport game or training and to automatically identify a change of status of the sport game.

8. The Smart-court system of claim 1, wherein the video that is transmitted from the cameras is automatically customized to adjust to environment conditions and does not require an intervention of an operator.

9. The Smart-court system of claim 1, wherein vibration in the stream of video is automatically reduced.

10. The Smart-court system of claim 1, wherein the data processing module further enables to create automatic customized video movie by integrating event or segments according to given criteria which are determined by the user or predefined by the system.

11. The Smart-court system of claim 1, wherein the computer is further programmed to identify a change of location of players when the players switch sides on a court used by the players during the sport session.

12. The Smart-court system of claim 1, further comprising an additional techniques and strategies module configured to provide recommendations to a player on how to correct activity in a sport game based on said analyzing.

13. The Smart-court system of claim 1, wherein said computer is further configured to use said identifying of the events, for cutting out idle time in the video stream.

14. The Smart-court system of claim 1, wherein said presentation module is further configured by programming, to enable playing an abridged video displaying only some of the identified events by jumping between some of the identified events according to a user query and the synchronized log event.

15. The Smart-court system of claim 1, wherein the presentation module is further configured by programming to play a virtual 3D dynamic scene using a 3D engine which simulates objects behavior based on said analyzing and the synchronized event log.

16. The Smart-court system of claim 1, wherein said computer is further configured to identify occurrence of a mental event based on said analyzing.

17. A method for implementing a smart court system, the method comprising the steps of capturing a sport session in a video stream using a plurality of video cameras;

receiving the video stream of the sport session on a computer;

simultaneously to said receiving, extracting a plurality of objects from frames of the video stream, thereby tracking the objects appearing in the video stream;

during the sport session, automatically analyzing motion and activities of the tracked objects that appear in the stream of video, the motion and activities comprising at least two interactions between a ball and an object;

automatically identifying events and classifying the events into types based on the tracking and analysis of the motion and the activities; and creating a synchronized event log of the classified events based on said identifying and classifying, wherein a user is enabled to combine biomechanical and tactical analysis of the video stream by selectively playing at least one of the identified events classified into types, by type, using the synchronized event log.

18. The method of claim 17, further comprising identifying in real time, a part of the sport session, the part starting with a stroke and ending when a player gains a score.

19. The method of claim 17, wherein the method further comprises playing an abridged video by jumping between some of the identified events based on a user query and according to the synchronized event log.

20. The method of claim 17, further comprising publishing and uploading game statistics, the online video and an associated event log in one or more social networks.

21. The method of claim 17, further comprising yielding a pattern of behavior and a tactical behavior of a player from more than one of the identified events.

22. The method of claim 21, further comprising generating and uploading to a social network, a profile of the player, the profile comprising information based on the yielded tactical behavior and the yielded pattern of behavior.

23. The method of claim 17, further comprising identifying a start and end of a sport game or training and automatically identifying a change of status of the sport game.

24. The method of claim 17, further comprising automatically customizing the video that is transmitted from the cameras to adjust to environment conditions and does not require an intervention of an operator.

25. The method of claim 17, further comprising automatically reducing vibration in the stream of video.

26. The method of claim 17, further comprising identifying the change of status by a predefined gesture of the user.

27. The method of claim 17, further comprising identifying change of designated location of players, when the players switch sides on the court.

28. The method of claim 17, further comprising providing recommendations to a player on how to correct activity in a sport game based on said analyzing.

29. The method of claim 17, further comprising cutting out idle time in the video file to save storage space using said identifying of the events.

30. The method of claim 17, further comprising playing an abridged video displaying only some of the identified events by jumping between some of the identified events according to a user query and the synchronized log event.

31. The method of claim 17, further comprising playing a virtual 3D dynamic scene based on the video stream, by using a 3D engine to simulate objects behavior based on said analyzing and the synchronized event log.

32. The method of claim 17, further comprising identifying occurrence of a mental event based on said analyzing.

33. The method of claim 17, further comprising creating customized video movie by integrating events or segments according to given criteria which are determined by the user or predefined by the system.

34. The method of claim 17, further comprising identifying unforced error based on identifying timing and position of a player before striking the ball.

35. The method of claim 17, further comprising real time automatic calculation of game score based on said identified and classified events and an analysis of player and ball position and motion.

36. The method of claim 17, further comprising comparing between the players' profiles and providing performance matching between players.

* * * * *